F. WEGNER.
CONVEYING AND FEEDING MECHANISM.
APPLICATION FILED SEPT. 28, 1910.
1,069,362.
Patented Aug. 5, 1913.
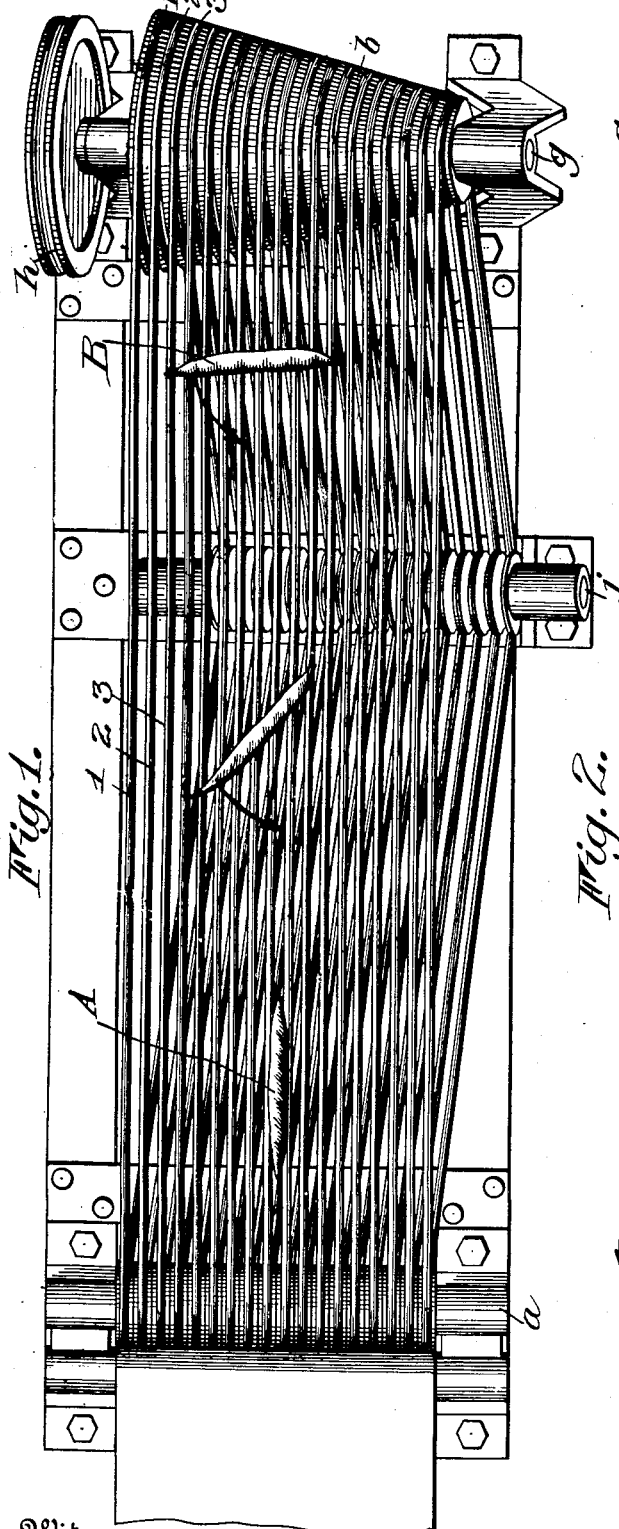
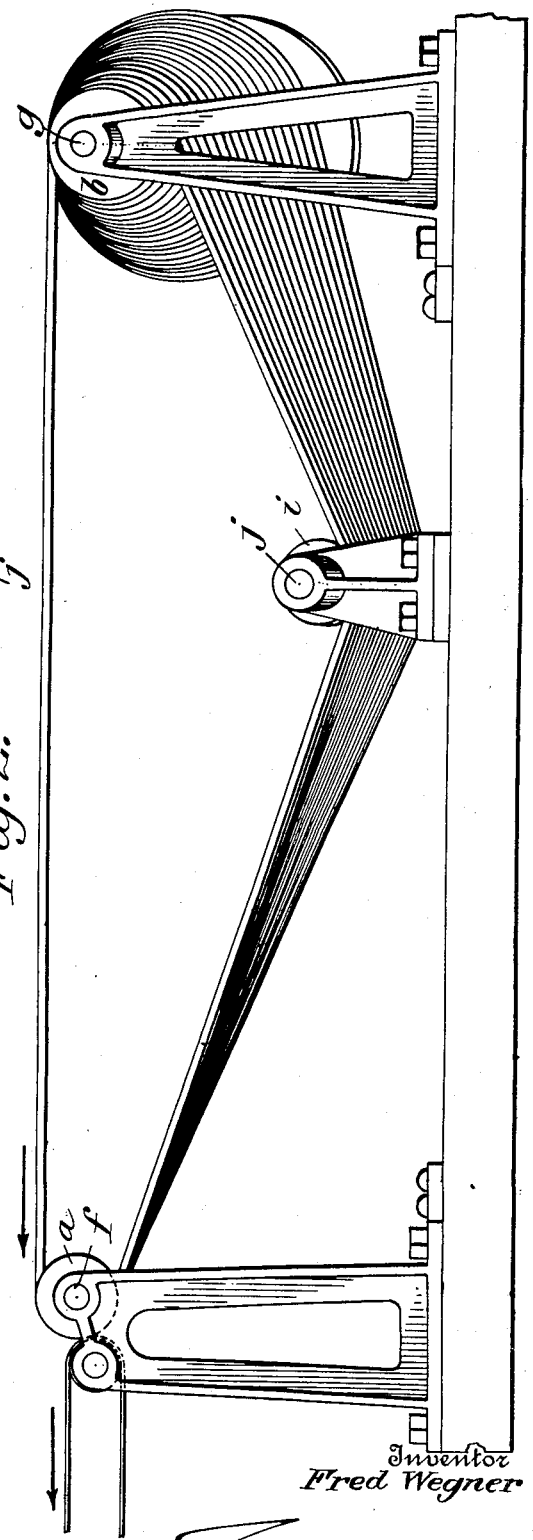
Inventor
Fred Wegner
Witnesses
By
his Attorneys

UNITED STATES PATENT OFFICE.

FRED WEGNER, OF FAIRPORT, NEW YORK.

CONVEYING AND FEEDING MECHANISM.

1,069,362.  Specification of Letters Patent.  Patented Aug. 5, 1913.

Application filed September 28, 1910. Serial No. 584,178.

*To all whom it may concern:*

Be it known that I, FRED WEGNER, of Fairport, in the county of Monroe and State of New York, have invented certain new and useful Improvements in Conveying and Feeding Mechanism; and I do hereby declare the following to be a full, clear, and exact description of the same, reference being had to the accompanying drawings, forming a part of the specification, and to the reference-numerals marked thereon.

My present invention relates to mechanisms adapted to be employed for conveying and feeding various articles to a machine or apparatus, which is adapted to perform certain operations upon them, and it has for its object to provide means for handling certain classes of goods, and particularly articles possessing greater length than breadth, said mechanism being particularly adapted to present the articles endwise at the point of discharge irrespective of the various positions they may assume when presented to the conveyer.

To these and other ends the invention consists in certain improvements and combinations of parts, all as will be hereinafter more fully described, the novel features being pointed out in the claims at the end of the specification.

In the drawings: Figure 1 is a top plan view illustrating one embodiment of my invention, and Fig. 2 is a side elevation thereof.

Similar reference numerals in the several figures indicate similar parts.

In performing many machine operations upon different objects it is essential that the articles be presented to the machine in an endwise direction in order that they may be properly received, held and treated by the machine during the operation or operations to which each article is subjected. In many instances the character of the goods permits them to be arranged or stacked in parallel order in the hopper or container from which they are fed, and when, from the nature of the goods, this cannot be done, it is usually necessary to feed them into the machine by hand.

In the present embodiment of my invention, the conveying and feeding mechanism is adapted to receive and transport articles from one given point to another where they are discharged, and during their travel imparts a horizontal turning or rotary movement to each article sufficient to cause it to extend lengthwise in the direction of its travel either at or before it arrives at the discharge point. The turning movement of some articles may be greater than that of others according to the initial position they may occupy when delivered to the feeding mechanism, and a further object of my invention is to provide an arrangement of parts whereby when an article has been once pointed in an endwise direction, either as a result of the movement of the mechanism or otherwise, it will continue its travel in this position without further alteration.

The present embodiment of my invention is shown as comprising a plurality of endless parallel belts 1—2 and 3, etc., the first of which travels at a given predetermined rate, each succeeding belt moving at a slightly decreased speed. All of the belts travel in the same direction but no two of them move at the same rate. The belts are supported at their ends upon suitable pulleys $a$ and $b$ with their upper strands or courses arranged in the same horizontal plane, as shown in Fig. 2. They may have flat surfaces, but I prefer to use belts which are circular in cross-section as they may then be located close together in side engagement, or separated only short distances, and still form a corrugated conveying surface.

In practice the belts may be selected of a diameter proportional to the weight and diameter of the articles transported and of varying lengths, dependent upon the average length of said articles, which will also determine the number of belts employed to make up the width of the conveying surface. The belts are usually placed near enough to one another to prevent the articles from passing between them, the alternate spaces thus formed constituting depressions in which the articles will lie when they have been turned endwise into the position indicated by A in Fig. 1.

A simple means of carrying out my invention consists in supporting the two ends of each belt upon separate pulleys, those at the ends of the separate belts forming the discharge end of the conveying surface being preferably of the same diameter, as indicated at $a$, and journaled for independent rotation upon a shaft $f$. At the other extremity of the conveying surface, which may be designated the receiving end, the ends of the separate belts are supported upon a conical pulley, such as b, journaled upon an inclined axis, as shown. This may be a solid cone grooved, as shown, or a series of separate pulleys keyed to a shaft g, one end of which is extended and provided with a driving pulley h rotated by any suitable source of power.

Between the ends of the conveyer and coöperating with the lower courses of the several belts are idlers i journaled on the inclined shaft j and operating as belt tensioning devices or tighteners, as will be understood.

The pulleys a at the discharge end of the conveyer being preferably of uniform diameter enable a receiving conveyer to be located in proximity thereto, as shown in Figs. 1 and 2, said belt running over a roller journaled with its axis parallel to the shaft f. By this construction the receiving conveyer may be brought so close to the pulleys a that the articles are delivered thereto without disturbing their endwise position.

From the arrangement of the parts described it will be seen that the rotation of the drive pulley b will cause the several belts to travel in the same direction, but by reason of the increasing diameter of the pulley the belts will be caused to travel at different speeds, the one passing around the larger end of the cone moving longitudinally considerably faster than the belt driven by the smaller end of said cone, and the intermediate belts each moving at a different rate of speed, said speeds varying gradually between the two extremes. An object placed upon the receiving end of the conveyer, as indicated at B, engages several of the belts and is carried along by them but as it is subjected throughout its length to the action of some belts which are traveling more rapidly than the others a turning movement is imparted to it in the direction indicated by the arrow, until it finally reaches the endwise position on the conveyer, as indicated at A. In this position it lodges in the corrugation or depression between two adjacent belts and is by them carried along and discharged at the roller a. In Fig. 1, I have shown the article A as having been turned into its endwise position near the discharge end of the conveyer, but it will be understood that it may assume this position at any point on the conveying surface. This turning movement of the articles is due to the fact that the frictional contact between them and the faster traveling belt causes one of their ends to be advanced, while their opposite extremities are retarded by frictional engagement with the slower moving belt or belts, the movement of the latter determining the rate of travel of the article from one end of the conveyer to the other.

A conveyer feeding mechanism constructed in accordance with my invention is adapted for various purposes, and a specific use to which it may be put is that of feeding string beans to the cutting or snipping machine which is employed for removing their tips or ends.

I claim as my invention:

1. A conveyer, composed of a plurality of endless belts, one strand of each belt being disposed in a horizontal plane common to the others, said strands being disposed in parallelism and spaced apart to form narrow depressions between them, of means for driving all of said belts in one direction at differential velocities to impart a turning movement to an article carried by said belts for causing it to assume a position in one or another of the depressions between adjacent belts.

2. In a conveyer, the combination with a plurality of endless belts, one strand of each belt being disposed in parallelism in a plane common to the others forming a conveying surface having alternately arranged longitudinally extending ridges, said strands being separated slightly and forming narrow intervening spaces between them, of a conical drive pulley supporting one end of each belt and idlers supporting the opposite extremities of said belts said idlers being of substantially the same diameter.

3. A conveyer composed of a plurality of endless belts substantially circular in cross section, arranged side by side and adapted to travel in the same direction at different speeds one strand of each of said belts lying in a horizontal plane common to said strands of said belts.

FRED WEGNER.

Witnesses:
G. WILLARD RICH,
RUSSELL B. GRIFFITH.